US012609649B2

(12) United States Patent
Min et al.

(10) Patent No.: US 12,609,649 B2
(45) Date of Patent: Apr. 21, 2026

(54) THREE-DIMENSIONAL SOLAR POWER GENERATION SYSTEM FOR SMART FARMS

(71) Applicant: KOREA INSTITUTE OF SCIENCE AND TECHNOLOGY, Seoul (KR)

(72) Inventors: Byoung Koun Min, Seoul (KR); Phillip Lee, Seoul (KR); Taehee Kim, Seoul (KR); Je Hyeong Jung, Gangneung-si (KR); Suk Joon Hwang, Seoul (KR); Young Rag Do, Seoul (KR); Chan Woo Lee, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 19/018,763

(22) Filed: Jan. 13, 2025

(65) Prior Publication Data

US 2025/0239968 A1 Jul. 24, 2025

(30) Foreign Application Priority Data

Jan. 24, 2024 (KR) ........................ 10-2024-0010584

(51) Int. Cl.
*H02S 40/22* (2014.01)
*A01G 9/24* (2006.01)
(Continued)

(52) U.S. Cl.
CPC .............. *H02S 40/22* (2014.12); *A01G 9/243* (2013.01); *G02B 5/28* (2013.01); *H02S 20/23* (2014.12)

(58) Field of Classification Search
CPC ......... H02S 40/22; H02S 20/23; A01G 9/243; G02B 5/28
See application file for complete search history.

(56) References Cited

U.S. PATENT DOCUMENTS

2011/0016779 A1* 1/2011 Hermans .............. A01G 9/1438
47/17
2013/0000691 A1* 1/2013 Aharon ................. H10F 77/488
136/246
(Continued)

FOREIGN PATENT DOCUMENTS

KR 10-2020-0100273 A 8/2020
KR 10-2021-0004055 A 1/2021

*Primary Examiner* — Jayne L Mershon
(74) *Attorney, Agent, or Firm* — NSIP Law

(57) ABSTRACT

The existing solar power generation panel installed on the roof of a smart farm has problems that an amount of light transmitted into the greenhouse is significantly reduced and the transmitted light is also not uniform, and thus an area where the solar power generation panels are installed is shaded and a shadow occurs. For these reasons, an installation distribution rate of solar power generation panels installed on the roofs of smart farms is very low. A solar power generation system for smart farms includes a three-dimensional (3D) optical filter window with a function of selectively transmitting light of wavelengths applicable to smart farms, and a solar power generation module provided to protrude above an optical filter of the optical filter window to increase solar power use efficiency. Since shading occurs when a solar power generation panel is used in a smart farm to affect cultivation, there is a problem in that the solar power generation panel cannot be used on the roof of a smart farm. However, according to the above-described configuration of the present invention, the optical filter window equipped with a dichroic light filter is used to solve this problem so that there is an effect of operating a smart farm more economically.

4 Claims, 7 Drawing Sheets

(51) Int. Cl.
    *G02B 5/28*          (2006.01)
    *H02S 20/23*       (2014.01)

(56)                 References Cited

U.S. PATENT DOCUMENTS

2024/0178789 A1*    5/2024    Althous  ............. G02B 19/0019
2025/0132722 A1*    4/2025    Ripalda Cobián ...... H02S 40/22

\* cited by examiner

[FIG. 1]
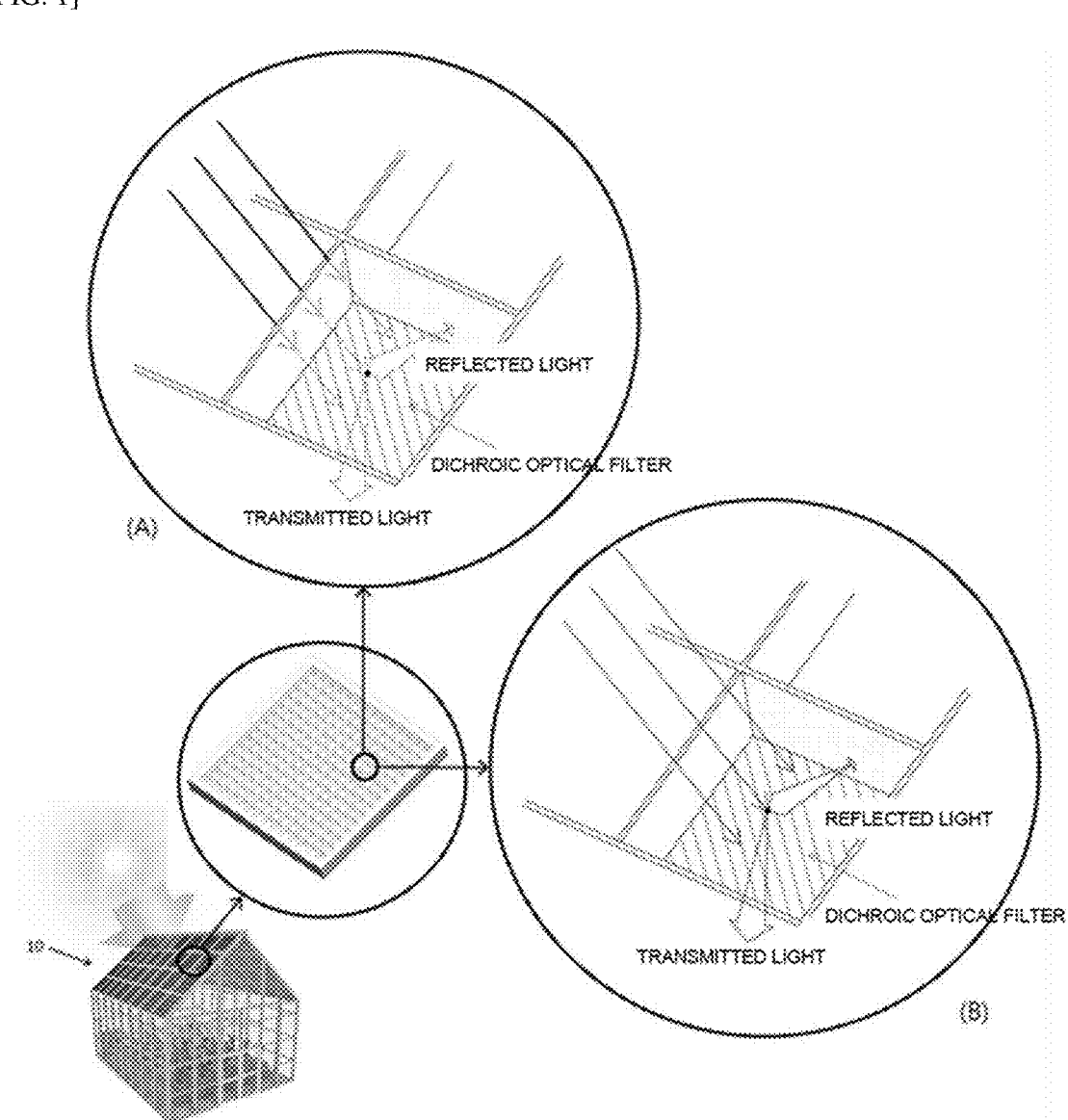

[FIG. 2]
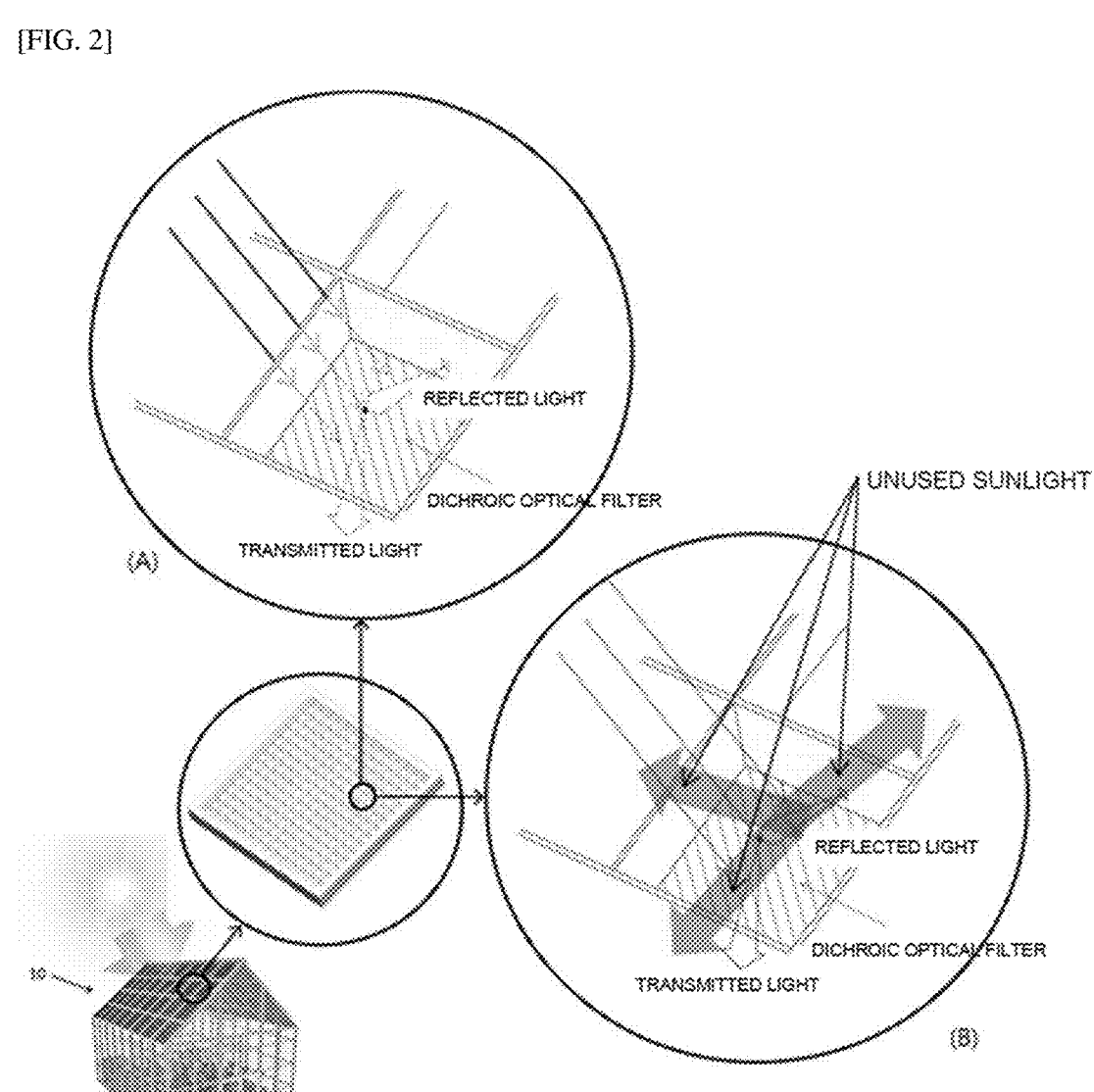

[FIG. 3]
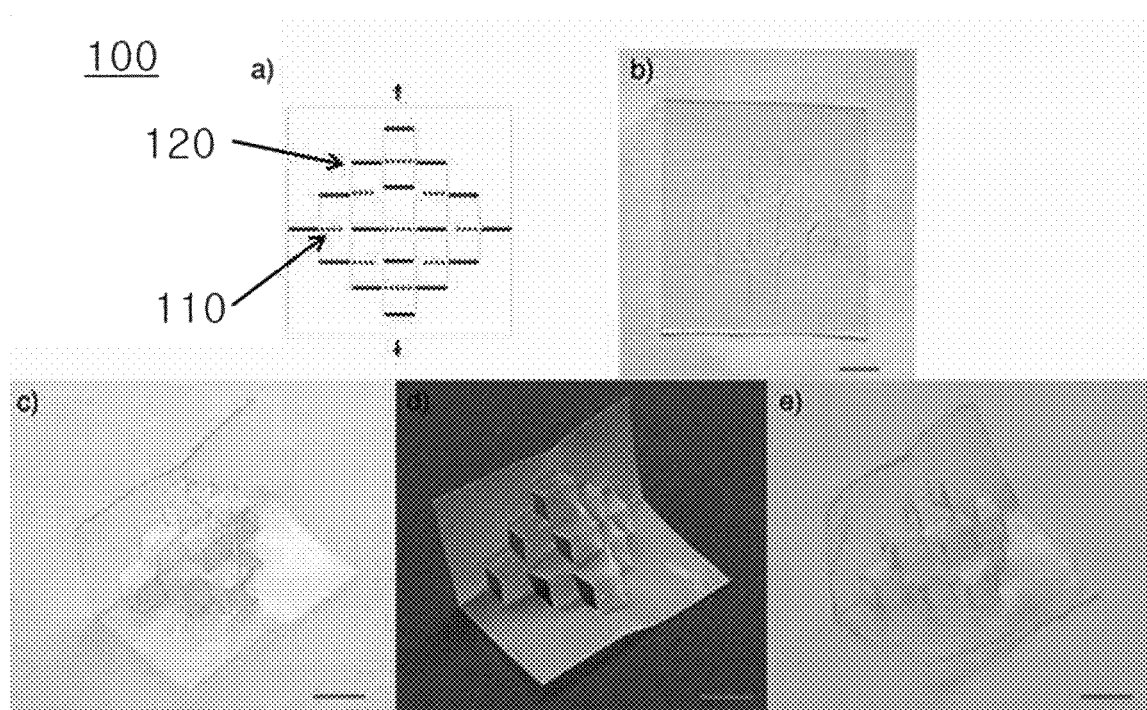

[FIG. 4]
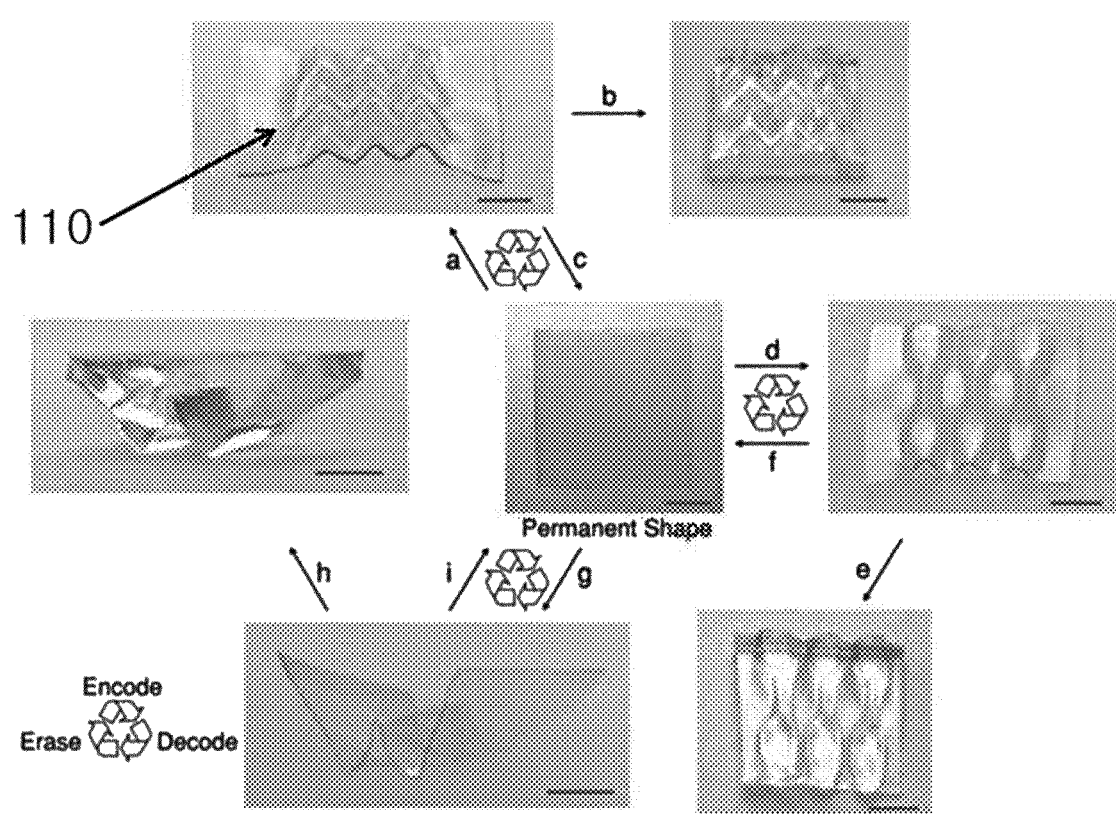

[FIG. 5]
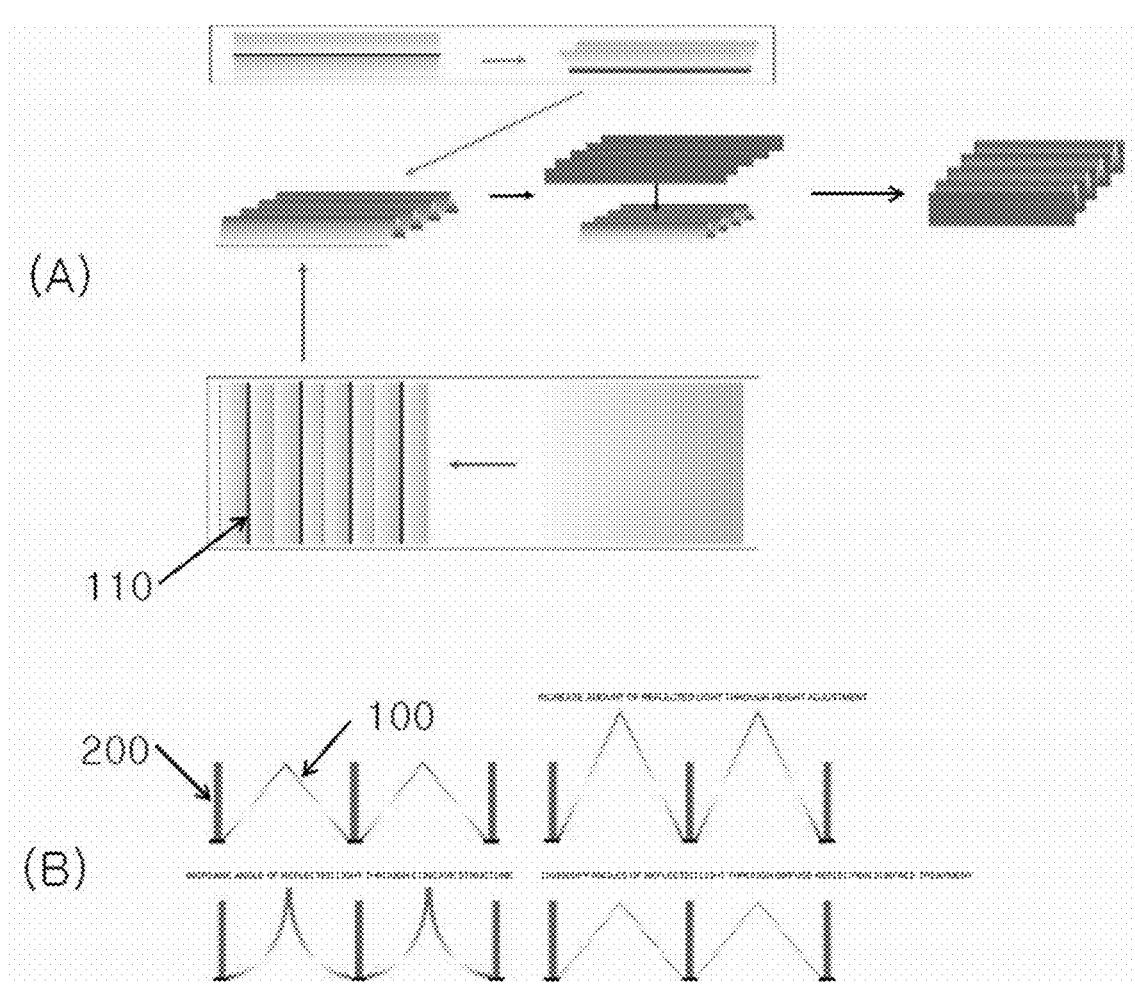

[FIG. 6]
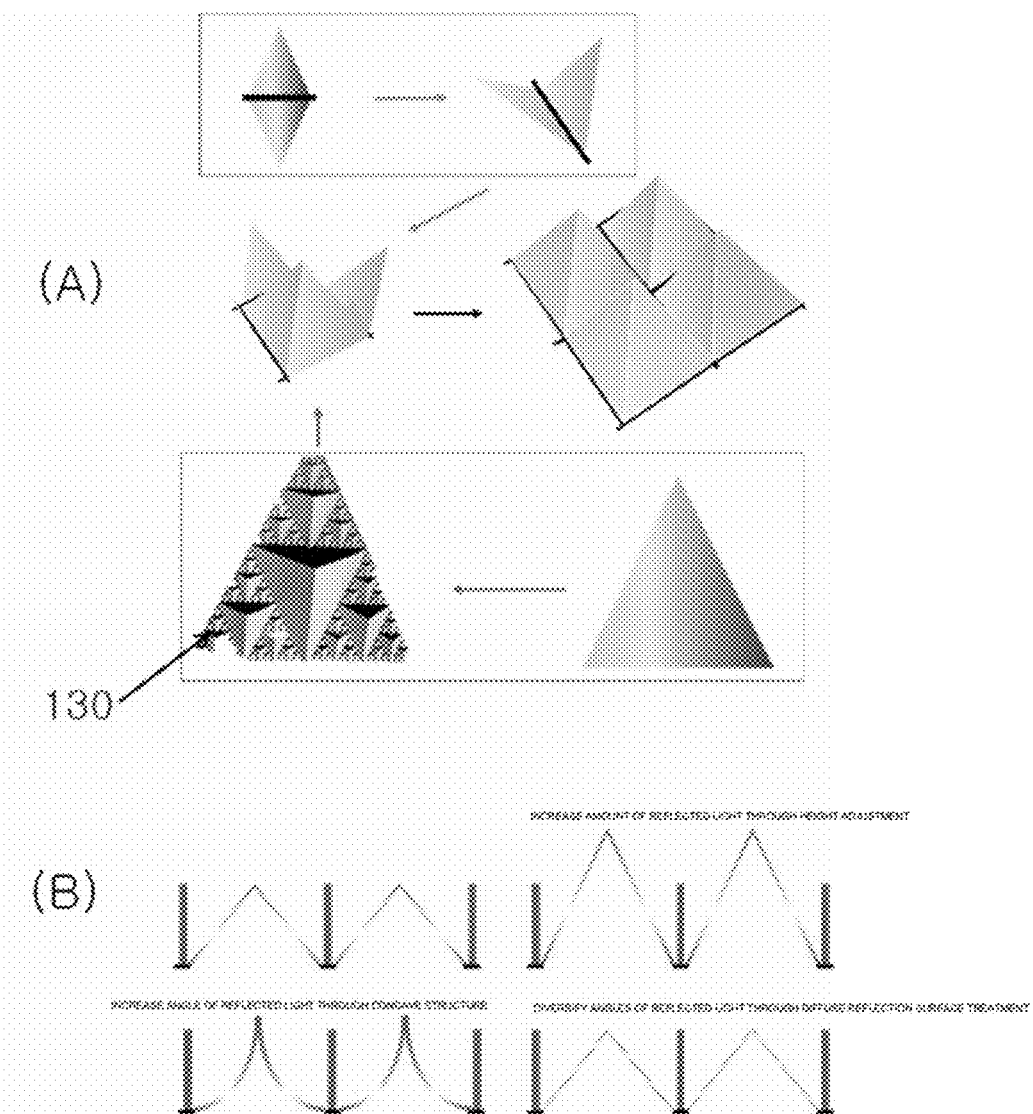
130

[FIG. 7]

THREE-DIMENSIONAL SOLAR POWER GENERATION SYSTEM FOR SMART FARMS

CROSS-REFERENCE TO RELATED APPLICATION

This application claims priority to and the benefit of Korean Patent Application No. 10-2024-0010584, filed on Jan. 24, 2024, the disclosure of which is incorporated herein by reference in its entirety.

BACKGROUND

1. Field of the Invention

The present invention relates to a solar power generation system that is applicable to be used in smart farms. More specifically, it relates to a technology for efficiently using sunlight to supply the necessary light sources to solar power generation units and smart farms by separating the wavelengths of the light source, reflecting and transmitting them.

2. Discussion of Related Art

As the related art before the application of the present invention, technology related to an eco-friendly sunlight module smart farm has been disclosed. In this technology, technology in which a solar power generation panel prevents a decrease in sunlight radiated to crops grown on a smart farm due to blocking of the sunlight, thereby growing crops and simultaneously increasing solar power generation efficiency in the smart farm is disclosed.

As another related art, technology related to a greenhouse using semi-transmissive solar cells has been disclosed. In this technology, technology in which semi-transmissive cells are used to transmit light of wavelengths necessary for plant growth and light of the remaining wavelengths that is not transmitted is used to generate sunlight is disclosed.

RELATED ART DOCUMENT

Patent Documents (Patent Document 1) Korean Patent Laid-Open Application No. 10-2021-004055

(Patent Document 2) Korean Registered Patent No. 10-2149597

SUMMARY OF THE INVENTION

In order to generate power, it is essential to install solar power generation panels on the top, the roof, and the walls of the facility facing the sun so that the solar power generation panels can directly receive sunlight. However, in plant cultivation facilities such as smart farms, solar power generation efficiency is important, but it is more important for plants to be able to use solar light needed for cultivation.

Existing solar power generation panels installed on the roof of a smart farm have problems that an amount of light transmitted into the greenhouse is significantly reduced and the transmitted light is also not uniform, and thus an area where the solar power generation panels are installed is shaded and a shadow occurs.

For these reasons, an installation distribution rate of the solar power generation panels installed on roofs of smart farms is very low.

The present invention is directed to providing technology that allows light necessary for crop cultivation to pass through as much as possible and uses sunlight not needed for cultivation to produce electricity.

According to an aspect of the present invention, there is provided a solar power generation system for a smart farm with a three-dimensional structure, characterized in that it is provided with a solar power generation module that is provided to protrude above the optical filter along the edge of the optical filter window.

In addition, a kirigami-origami-based solar power generation system for smart farms in which the optical filter window utilizes a substrate with a folded portion or a flexible substrate so that it can be folded at various angles, thereby allowing the sunlight necessary for cultivation to pass through at a constant rate and the solar power generation module produced electricity from the optical filter window lower and multi-path reflected sunlight that is not needed for cultivation.

In addition, a kirigami-origami-based solar power generation system for smart farms in which an optical filter window is formed of a substrate on which folding portions are formed or a flexible substrate, cut lines are formed on the substrate in a predetermined pattern, and the substrate is folded to form a 3D pattern, and thus constant transmission of the sunlight required for cultivation is maintained and reflected light is used as sunlight not used for cultivation so that solar power generation efficiency of the solar power generation module is improved is provided.

In addition, a kirigami-origami-based solar power generation system for smart farms in which an optical filter window is formed of a foldable or flexible substrate material to be folded consistently, and thus a constant supply of sunlight in a wavelength band required for a smart farm to an inside of the smart farm is maintained, and reflectance of sunlight not used for cultivation is improved toward the solar power generation module which is placed above an optical filter and generates power by reflected light is provided.

In addition, the kirigami-origami-based solar power generation system for smart farms in which the optical filter window is a dichroic optical filter is provided.

In addition, the kirigami-origami-based solar power generation system for smart farms in which the solar power generation module is made of a foldable or flexible substrate material, cut lines are formed on the solar power generation module in a predetermined pattern, and the solar power generation module is folded to form a 3D pattern, and thus solar power generation efficiency is improved regardless of an angle change due to movement of the sunlight is provided.

In addition, a kirigami-origami-based solar power generation system for smart farms in which an optical filter window is made of a foldable or flexible substrate material to be provided in a polyhedral shape including a quadrangular pyramid shape using cutting and folding methods, and thus supply of sunlight required for cultivation is maintained and the sunlight not used for cultivation is reflected to a solar power generation module so that the solar power generation efficiency is improved is provided.

In addition, a 3D solar power generation system for smart farms includes an optical filter window provided on a roof of a smart farm and configured to transmit light of selected wavelengths and reflect light of other wavelengths, and a solar power generation module provided to protrude above an optical filter of the optical filter window, wherein a horizontal or vertical folding portion is introduced into the optical filter window, and the optical filter window uses the reflected light of other wavelengths for power generation in the solar power generation module provided to protrude above the optical filter of the optical filter window.

In addition, a 3D solar power generation system for smart farms includes an optical filter window provided on a roof of a smart farm and configured to transmit light of selected wavelengths and reflect light of other wavelengths, and a solar power generation module provided to protrude above an optical filter of the optical filter window, wherein the dichroic optical filter has a 3D shape having various shapes such as waves that are the same or that narrow and widen in a horizontal or vertical direction using a flexible substrate, and thus constant transmission of sunlight of selected wavelengths required for smart farm cultivation is maintained, and a direction in which light of other wavelengths is reflected is directed to the solar power generation module provided to protrude above the optical filter of the optical filter window so that solar power generation efficiency of the solar power generation module is improved.

In addition, a 3D solar power generation system for smart farms includes an optical filter window provided on a roof of a smart farm and configured to transmit light of selected wavelengths and reflect light of other wavelengths, and a solar power generation module provided to protrude above an optical filter of the optical filter window, wherein cut lines are formed on the optical filter window in a predetermined pattern and the optical filter window is folded and formed in a 3D shape of a triangular or quadrangular shape, and thus constant transmission of sunlight of selected wavelengths required for smart farm cultivation is maintained, and a direction in which light of other wavelengths is reflected is directed to the solar power generation module provided to protrude above the optical filter of the optical filter window so that solar power generation efficiency of the solar power generation module is improved.

In addition, the optical filter window may be a dichroic optical filter.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 1 is an explanatory diagram for describing an operating principle of the present invention;

FIG. 2 is an explanatory diagram for describing a reason for improvement in the present invention;

FIG. 3 is an explanatory diagram of an optical filter window three-dimensionally formed using kirigami and origami in the present invention;

FIG. 4 is an explanatory diagram illustrating that an optical filter window is formed three-dimensionally using kirigami and origami in the present invention;

FIG. 5 is an explanatory diagram for describing that the optical filter window is formed three-dimensionally using origami and an arrangement with a solar power generation module is formed in various ways in the present invention;

FIG. 6 is an explanatory diagram illustrating that the optical filter window is formed in a polyhedral shape, including a quadrangular pyramid, using kirigami and origami, and a surface in various forms, such as in three dimensions and with surface roughness, is also presented for utilizing reflected light in the present invention.

FIG. 7 is an explanatory diagram for describing that the optical filter window is formed in a quadrangular pyramid shape using kirigami and origami and solar power generation modules are arranged in a grid and used in the present invention.

DETAILED DESCRIPTION OF EXEMPLARY EMBODIMENTS

The effects of the above-described configuration of the present invention will be described below using the accompanying drawings.

Currently, due to the climate crisis caused by global warming, food production is disrupted due to typhoons, tsunamis, heavy rain, abnormally high and abnormally low temperatures, and the like, causing a food crisis all over the world, and thus stable production of food is emerging as a very serious problem.

Smart farms aim to solve these problems. The goals of smart farms are to maintain a stable cultivation environment and to grow and supply food stably in this environment. However, in order to maintain such a stable cultivation environment, much energy is required to control an environment inside a smart farm.

Solar power generation, wind power generation, and marine power generation, which are referred to as new renewable energy, are being used in many fields, but have not yet been used successfully in the smart farm field. In particular, solar power generation is promising, but sunlight is essential for crop cultivation, so when the sunlight is used for power generation, there is a problem of insufficient sunlight to be used for crop cultivation.

There are cases in which solar power generation panels installed on the roof of a smart farm are used. However, there are problems that an amount of sunlight transmitted into the smart farm is reduced and uniformity of the transmitted sunlight is not consistent, causing a shortage of the sunlight in some locations where crops are planted.

For these reasons, solar power generation has been evaluated as a technology that is difficult to apply to smart farms. That is, although it is possible to develop it to the extent of operating a system, a limitation of the current technology is that it cannot serve as a sufficient energy resource to solve cooling and heating needs to operate a smart farm.

In order to overcome these technical limitations, as shown in FIG. 1, technology is being developed and used to generate sunlight by transmitting light needed for cultivation and selectively reflecting light not needed for cultivation. That is, transmissive and semi-transmissive technology has been conventionally used for sunlight in all wavelength bands, but this technology transmits light in all wavelength bands necessary for cultivation into the smart farm and reflects light in wavelength bands not necessary for cultivation using a dichroic optical filter, thereby using the transmitted light in solar power generation.

Although this technology is a very effective and efficient technology, because technology of transmitting as much of the light reflected from the dichroic optical filter as possible to the solar power generation module provided at an angle to a main surface of the dichroic light filter has not been developed multi-reflected angles. That is the reason why a large amount of sunlight is not used for power generation.

FIG. 2 shows such a phenomenon. A solar power generation module may have an appropriate shape and size, may be transparent, translucent, or opaque, and may have a singlesided or double-sided shape in order to allow sunlight of wavelengths required for cultivation to be transmitted well into a smart farm.

In addition, the higher the solar power generation module is formed around the dichroic optical filter, the more light reflected from the dichroic optical filter may be used for power generation. However, when it is formed at a high position, not only does an installation cost increase, but also it may be a cause of a shadow by blocking sunlight. For these reasons, in the present invention, the technology of most efficiently using light is applied to smart farms using kirigami and origami methods.

FIG. 3 is an explanatory diagram of an optical filter window three-dimensionally formed using kirigami and origami in the present invention. According to the dictionary, the term "kirigami" is a combination of the Japanese words "kiri" meaning "cut," and "gami" meaning "paper" and refers to cutting paper into a specific pattern or shape and then folding it to form a three-dimensional (3D) shape like a pop-up card. As Japanese paper folding became widely known, Lillian Oppenheimer, founder of OrigamiUSA, proposed "origami" as an international term to refer to such paper folding. As a result, the term "origami" is now used to refer to "paper folding" around the world. That is, "kirigami" and "origami" refer to the processes of cutting and folding two-dimensional (2D) materials such as paper into 3D shapes or various shapes. In the present invention, "kirigami" is used to refer to making a 3D shape through cutting and folding, and "origami" is used to refer to making a 3D shape through folding or bending. Cut lines 120 and fold lines 110 may be provided on a 2D dichroic optical filter, and the dichroic optical filter may be folded to implement a 3D shape.

(a) of FIG. 3 shows a process of drawing cut lines 120 and fold lines 110 on the dichroic optical filter 100.

(b) of FIG. 3 shows a process of cutting the cut lines.

(c-e) of FIG. 3 shows a process of folding the fold lines 110 to form a 3D-shaped dichroic optical filter 100.

The dichroic optical filter produced in this way may be directly used and also be used by gathering several pieces into a polyhedral shape such as a quadrangular pyramid. The folded line is further provided with a metal cable whose length changes depending on a temperature to adjust an angle of a folded portion according to the temperature so that a temperature of a heated portion changes according to an angle at which the sun shines, and the angle of the folded portion changes so that the angle at which sunlight is reflected may be adjusted. The related claim is claim 3, and cut lines 120 are formed in a predetermined pattern and folded to form the dichroic optical filter 100 (optical filter window) in a 3D shape of a triangular or quadrangular shape. Thus, constant transmission of sunlight with light of selected wavelengths required for smart farm cultivation is maintained, and a direction in which light of other wavelengths is reflected is directed to the solar power generation module provided to protrude above an optical filter of the optical filter window.

FIG. 4 is an explanatory diagram illustrating that an optical filter window is formed three-dimensionally using kirigami and origami in the present invention. The dichroic optical filter 100 may be folded in a straight, curved, or cross shape to form a reflective surface on a side surface so that the reflected light may be used in a solar power generation module. The dichroic optical filter 100 produced in this way may be directly used and may also be used by gathering several pieces into a polyhedral shape such as a quadrangular pyramid. The related claim is claim 2, and the dichroic optical filter 100 (optical filter window) has a 3D shape having various shapes such as waves that are the same or that narrow and widen in a horizontal or vertical direction using a flexible substrate. Thus, constant transmission of sunlight of selected wavelengths required for smart farm cultivation is maintained, and a direction in which light of other wavelengths is reflected is directed to the solar power generation module provided to protrude above an optical filter of the optical filter window.

FIG. 5 is an explanatory diagram for describing that the optical filter window is formed three-dimensionally using origami and an arrangement with a solar power generation module is formed in various ways in the present invention. By folding a dichroic optical filter 100 (optical filter window) in a zigzag pattern with different widths and installing a solar power generation module in the folded valley, an example of a kirigami-origami-based solar power generation system for smart farms for more efficient sunlight is provided. In this case, when the dichroic optical filter 100 is assembled with different widths, a height difference with the solar power generation module may be differentiated, and the side surface when folded is transformed into a straight or curved shape. Thus, solar power generation efficiency may be improved by increasing a light concentration effect, and additional power generation optimization is possible by controlling the height, angle, and shape of the solar power generation module. The related claim is in claim 1, and the dichroic optical filter 100 (optical filter window) is formed to introduce horizontal or vertical folding portions so that the reflected light of different wavelengths is emitted above the optical filter of the optical filter window. Thus, generation efficiency of the solar power generation module is increased by adjusting the angle of reflected sunlight.

FIG. 6 is an explanatory diagram illustrating that an optical filter window is formed in a square pyramid shape using kirigami and origami 130 and a surface also has various shapes formed three-dimensionally in the present invention. Another embodiment is shown in which a dichroic optical filter 100 formed to increase diffuse reflection or light reflection in a selected direction is used by folding or cutting an outline into a triangular shape to form an optical filter window in a quadrangular pyramid shape. In this case, a height and a side surface shape may be modified considering a height of sunlight and seasonal use.

Figure 7:
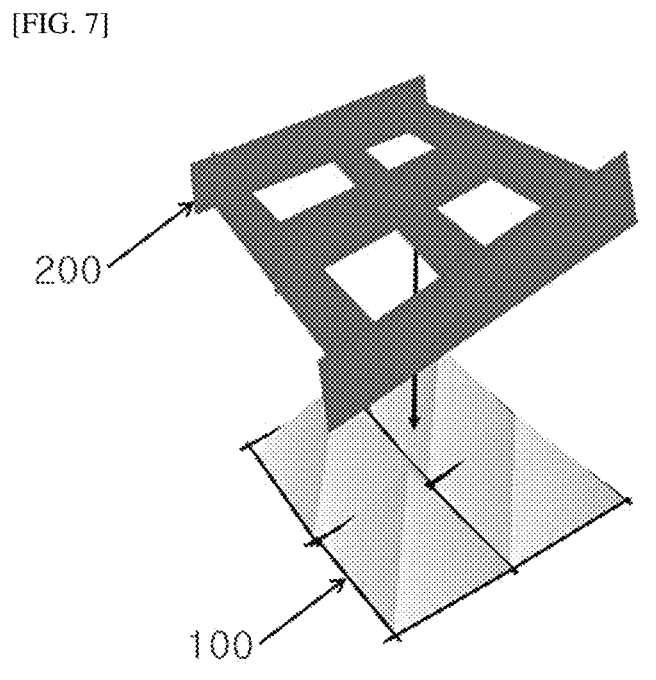

FIG. 7 is an explanatory diagram for describing that the optical filter window is formed in a quadrangular pyramid shape using kirigami and origami and solar power generation modules 200 are arranged in a grid and used in the present invention. FIG. 7 is an explanatory diagram illustrating a solar power generation module 200 provided on an edge of a quadrangular pyramid-shaped optical filter window. By providing the solar power generation module 200 perpendicular to the quadrangular pyramid-shaped optical filter window or at different angles as necessary, power generation efficiency can be increased by concentrating sunlight reflected from the optical filter window on the solar power generation module 200.

According to the above-described configuration of the present invention, there is an effect of being able to generate a greater amount of electricity from the solar power generation module. According to the present invention, a technology through which a smart farm can be operated more economically using the electricity generated in this way for cooling in the summer and heating in the winter without additional power is provided.

The configuration of the present invention to achieve the above-described effects of the present invention is as follows.

A kirigami-origami-based solar power generation system for smart farms includes an optical filter window with a function of selectively transmitting light of wavelengths applicable to smart farms, and a solar power generation module provided to protrude above an optical filter of the optical filter window.

In addition, the kirigami-origami-based solar power generation system for smart farms in which the optical filter window is used by being folded at various angles using a substrate with folding portions or a flexible substrate, and thus constant transmission of the sunlight required for cultivation is maintained and reflected light is used as sunlight not used for cultivation so that the solar power generation efficiency of the solar power generation module can be improved is provided.

In addition, the kirigami-origami-based solar power generation system for smart farms in which the optical filter window is formed of a foldable substrate or a flexible substrate, cut lines 120 are formed on the substrate in a predetermined pattern, and the substrate is folded to form a 3D pattern is provided. Thus, constant transmission of the sunlight required for cultivation is maintained and reflected light is used as sunlight not used for cultivation so that the solar power generation efficiency of the solar power generation module can be improved.

In addition, the kirigami-origami-based solar power generation system for smart farms in which the optical filter window is uniformly folded using a substrate with folding portions or a flexible substrate, and thus constant transmission of the sunlight required for cultivation inside the smart farm is maintained and the sunlight not used for cultivation is reflected to the solar power generation module optimized for a reflected light source of the optical filter by optimizing the height, angle, and shape of an upper portion of the optical filter to the edge of the optical filter window is provided.

In addition, the kirigami-origami-based solar power generation system for smart farms in which the optical filter window is a dichroic optical filter 100 is provided.

In addition, the kirigami-origami-based solar power generation system for smart farms in which the solar power generation module is made of a foldable or flexible substrate material, cut lines 120 are formed on the solar power generation module in a predetermined pattern, and the solar power generation module is folded to form a 3D pattern is provided. Thus, the solar power generation efficiency can be improved regardless of an angle change due to movement of the sunlight.

In addition, the kirigami-origami-based solar power generation system for smart farms in which the solar power generation module is made of a foldable or flexible substrate material to be provided in a quadrangular pyramid shape using cutting and folding methods is provided. Thus, constant transmission of the sunlight required for cultivation is maintained and the sunlight that is not used for cultivation is reflected to the solar power generation module so that the solar power generation efficiency can be improved.

Since light cannot be selectively used in smart farms, there are cases in which cultivation efficiency and solar power generation are inversely proportional. According to the present invention, solar power generation can solve the problem of not being able to be used on a roof using an optical filter window equipped with a dichroic optical filter 100 and changing a shape of the optical filter window by bending, folding, cutting, or attaching the dichroic optical filter 100 to improve a reflection ability, thereby increasing solar power generation efficiency.

Due to the above-described problem of shading or insufficient power generation, solar power generation is not actively applied to smart farms and is only an auxiliary electricity supply part. However, according to the present invention, technology is provided that can contribute to the expansion of smart farms by improving competitiveness of smart farms by sufficiently supplying power necessary for smart farms by uniformly supplying light for cultivation and improving power generation efficiency through the above-described configuration of the present invention.

What is claimed is:

1. A solar power generation system provided with a three-dimensional (3D)-shaped optical filter window for a smart farm, the solar power generation system comprising:
   an optical filter window provided on a roof of a smart farm and configured to transmit light of selected wavelengths and reflect light of other wavelengths; and
   a solar power generation module provided to protrude above an optical filter window along an edge thereof,
   wherein a horizontal or vertical folding portion is introduced into the optical filter window, and the optical filter window uses the reflected light of other wavelengths for power generation in the solar power generation module provided to protrude above the optical filter of the optical filter window, and
   wherein the optical filter window is kirigami-origami-based, comprises a dichroic optical filter, comprises a foldable or flexible substrate with cut lines formed in a predetermined pattern, and the substrate is folded to form a 3D pattern such that sunlight necessary for cultivation passes through at a constant rate and multi-path reflected sunlight not necessary for cultivation is directed to the solar power generation module to improve solar power generation efficiency regardless of an angle change due to movement of the sunlight.

2. The solar power generation system of claim 1, wherein a line along the substrate folded comprises a metal cable.

3. The solar power generation system of claim 2, wherein a length of the metal cable changes depending on a temperature.

4. The solar pawer generation system of claim 1, wherein the 3D pattern comprises at least one of triangular shape and quadrangular shape.

\* \* \* \* \*